United States Patent [19]

Kudo

[11] Patent Number: 4,672,459
[45] Date of Patent: Jun. 9, 1987

[54] COMMUNICATION TERMINAL APPARATUS WITH DATA FORMAT CONVERSION CAPABILITY

[75] Inventor: Shozo Kudo, Yokohama, Japan
[73] Assignee: Ricoh Company, Ltd., Tokyo, Japan
[21] Appl. No.: 881,471
[22] Filed: Jul. 7, 1986

Related U.S. Application Data

[63] Continuation of Ser. No. 672,276, Nov. 16, 1984, abandoned.

[30] Foreign Application Priority Data

Nov. 18, 1983 [JP] Japan .................. 58-216128

[51] Int. Cl.⁴ .................. H04N 1/32; H04N 1/40
[52] U.S. Cl. .................. 358/257; 358/280; 364/518; 370/61
[58] Field of Search ............. 358/257, 256, 263, 280, 358/296; 364/518, 521; 370/61; 178/2 R, 2 B, 2 G, 4, 26 R, 30

[56] References Cited

U.S. PATENT DOCUMENTS

| | | | |
|---|---|---|---|
| 3,958,088 | 5/1976 | Vieri | 358/257 |
| 4,317,136 | 2/1982 | Keyt et al. | 358/256 |
| 4,419,697 | 12/1983 | Wada | 358/257 |
| 4,485,411 | 11/1984 | Yamamoto | 358/296 |

Primary Examiner—Howard W. Britton
Assistant Examiner—John K. Peng
Attorney, Agent, or Firm—Oblon, Fisher, Spivak, McClelland & Maier

[57] ABSTRACT

A facsimile machine for use as a terminal in a communication network includes a scanner for optically reading an original document to produce graphic information and a keyboard for producing character information and control information as operated by an operator. The graphic and character information thus inputted is then combined to form mixture information which is transmitted to a receiver terminal as long as the receiver terminal is capable of receiving such mixture information. If the receiver terminal has been found to be not equipped to receive such mixture information, the present facsimile machine automatically converts the character portion of the mixture information to graphic information thereby making all the information to be graphic prior to transmission to the receiver terminal.

7 Claims, 5 Drawing Figures

COMMUNICATION TERMINAL APPARATUS WITH DATA FORMAT CONVERSION CAPABILITY

This is a continuation application from application Ser. No. 672,276 filed Nov. 16, 1984 now abandoned.

BACKGROUND OF THE INVENTION

1. Field of the Invention

This invention relates to a terminal apparatus for use in a communication network, and particularly to a communication terminal apparatus capable of handling a mixture of graphic information and character information.

2. Description of the Prior Art

Standardization of Group 4 facsimile machines (hereinafter also referred to as G4 machines) is being under way at CCITT. G4 machines are directed to improvements over Group 3 facsimile machines, for example, in resolution and transmission rate, and also to the provision of so-called "telematic service" for handling a mixture of graphic and character information. G4 machines are classified into three classes depending on the function. A class 1 G4 machine is functionally a simple facsimile machine so that it cannot receive or transmit character information at all. A class 2 G4 machine is provided with a function to receive character information in addition to the usual facsimile function, so that it can receive character information but it cannot transmit character information.

On the other hand, a class 3 G4 machine has a function not only to receive but also to transmit a mixture of graphic and character information. For this reason, the class 3 G4 machine is provided with a screen editor unit, thereby allowing an operator to insert character information into graphic information or graphic information into character information to create new information to send by looking at the screen of display unit, such as a CRT display unit. The new information thus created is once stored in an image memory, and, thus, in principle, a memory-to-memory communication is carried out in the case of G4 machines.

Under the circumstances, if desired to send a mixture of graphic and character information from a class 3 G4 machine to a class 1 G4 machine, a following problem will be encountered. That is, since the class 1 machine is not so structured to receive character information as described above, the mixture information to send must first be reproduced on a sheet of paper at the class 3 machine, and, then, the sheet of paper having thereon the reproduced mixture information must be optically read by a scanner thereby converting the mixture information to all graphic information. Such an operation is cumbersome and it can cause lowering of transmission efficiency.

SUMMARY OF THE INVENTION

It is therefore a primary object of the present invention to obviate the disadvantages of the prior art as described above and to provide an improved terminal apparatus for use in a communication network.

Another object of the present invention is to provide an improved communication terminal apparatus which is high in operability as well as in transmission efficiency.

A further object of the present invention is to provide an improved communication terminal apparatus which is increased in convenience in usage.

A still further object of the present invention is to provide an improved communication terminal apparatus which is so structured to automatically convert character information into graphic information if a receiver terminal apparatus is not structured to receive character information.

Other objects, advantages and novel features of the present invention will become apparent from the following detailed description of the invention when considered in conjunction with the accompanying drawings.

DESCRIPTION OF THE PREFERRED EMBODIMENTS

Figure 1:
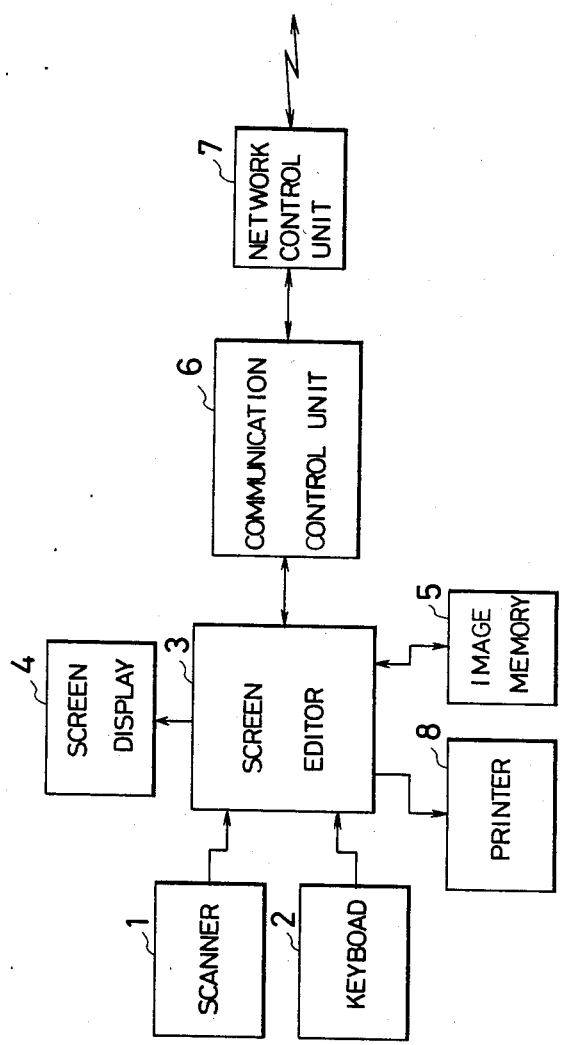
FIG. 1 is a block diagram showing the overall structure of a communication terminal apparatus constructed in accordance with one embodiment of the present invention.

Referring now to FIG. 1, there is shown in block form the overall structure of a G4 facsimile terminal apparatus constructed in accordance with one embodiment of the present invention. As shown, the apparatus includes a scanner 1 for optically reading an original document to produce graphic information to send, a keyboard 2 for inputting not only character information to send but also control information, such as edit control information, and a screen editor 3 which is connected to the scanner 1 and keyboard 2 for receiving graphic and character information therefrom.

At the screen editor 3, in accordance with the edit control information supplied by an operator through the keyboard 2, the graphic information supplied from the scanner 1 and the character information supplied from the keyboard 2 are edited in a suitable manner to produce new information to send, which is visually displayed on the screen of a screen display 4. Since this control is implemented almost instantly as soon as an appropriate edit control signal is inputted, the operator can edit the information at will by operating the keyboard 2 while looking at the screen of screen display 4. It is to be noted that the information displayed on the screen of screen display 4 corresponds to a single page of information to be transmitted.

Figure 2:
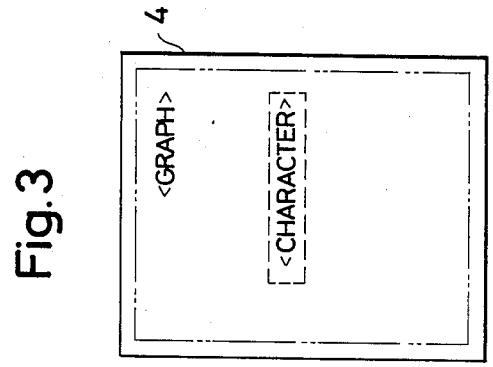
FIGS. 2 and 3 are schematic illustrations showing examples of a page of information when displayed on the screen of a display unit.
Figure 3:
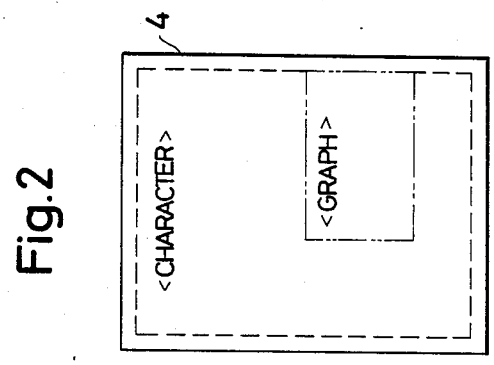

As schematically shown in FIGS. 2 and 3, with the system shown in FIG. 1, the operator can insert graphic information as an inset into the all originally character information displayed on the screen as shown in FIG. 2; whereas, the operator can also insert character information as an inset into the all originally graphic information displayed on the screen as shown in FIG. 3. It is to be noted that the position of such an inset may be easily determined by the operator using the keyboard 2.

Figure 4:
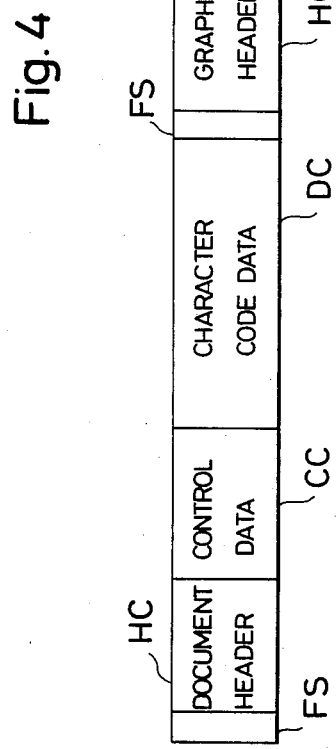
FIG. 4 is a schematic illustration showing the frame format of information when stored into an image memory.

The current information displayed on the screen of screen display 4 consists of a single page of information to send and this information is also stored temporarily in an image memory 5, which is also connected to the screen editor 3. When stored in the image memory 5, the information on the screen is stored with character information separately from graphic information, if the information on the screen is a mixture of character and graphic information, as shown in FIG. 4. Described more in detail in this respect, the character information is stored in the image memory 5 in such a format having a document header HC indicating what follows is character information, a control data CC indicating the position and extent occupied by the character information and the size of character, etc. and character code data DC including codes of characters defining the character information and format control codes. On the other hand, the graphic information is stored in the image memory 5 in such a format having a graph header HG indicating what follows is graphic information, a control data CG indicating the position, extent or the like relating to the graphic information, and graphic data DG essentially including dot information. Furthermore, in order to discriminate one kind of information from the other, a flag FS is inserted between the two. Or, it may be said that each kind of information is preceded by a flag FS.

As mentioned above, the character and graphic information may be each modified by operating the keyboard 2 while they are displayed on the screen of screen display 4 as mixed as shown in FIGS. 2 and 3. Whenever such a modification is carried out, the information displayed on the screen of screen display 4 is momentarily renewed accordingly and at the same time the information stored in the image memory 5 is also renewed. It is to be noted that in the preferred embodiment, when the screen editor 3 receives graphic information from the scanner 1, it compresses the graphic information by having it encoded as well known in the art. Thus, the encoded graphic information is stored in the image memory 5 as the graphic data DG. In this case, since the graphic information is compressed, more information may be stored in the image memory 5 having a given capacity, or, alternatively, use may be made of a memory device having a smaller capacity.

Figure 5:
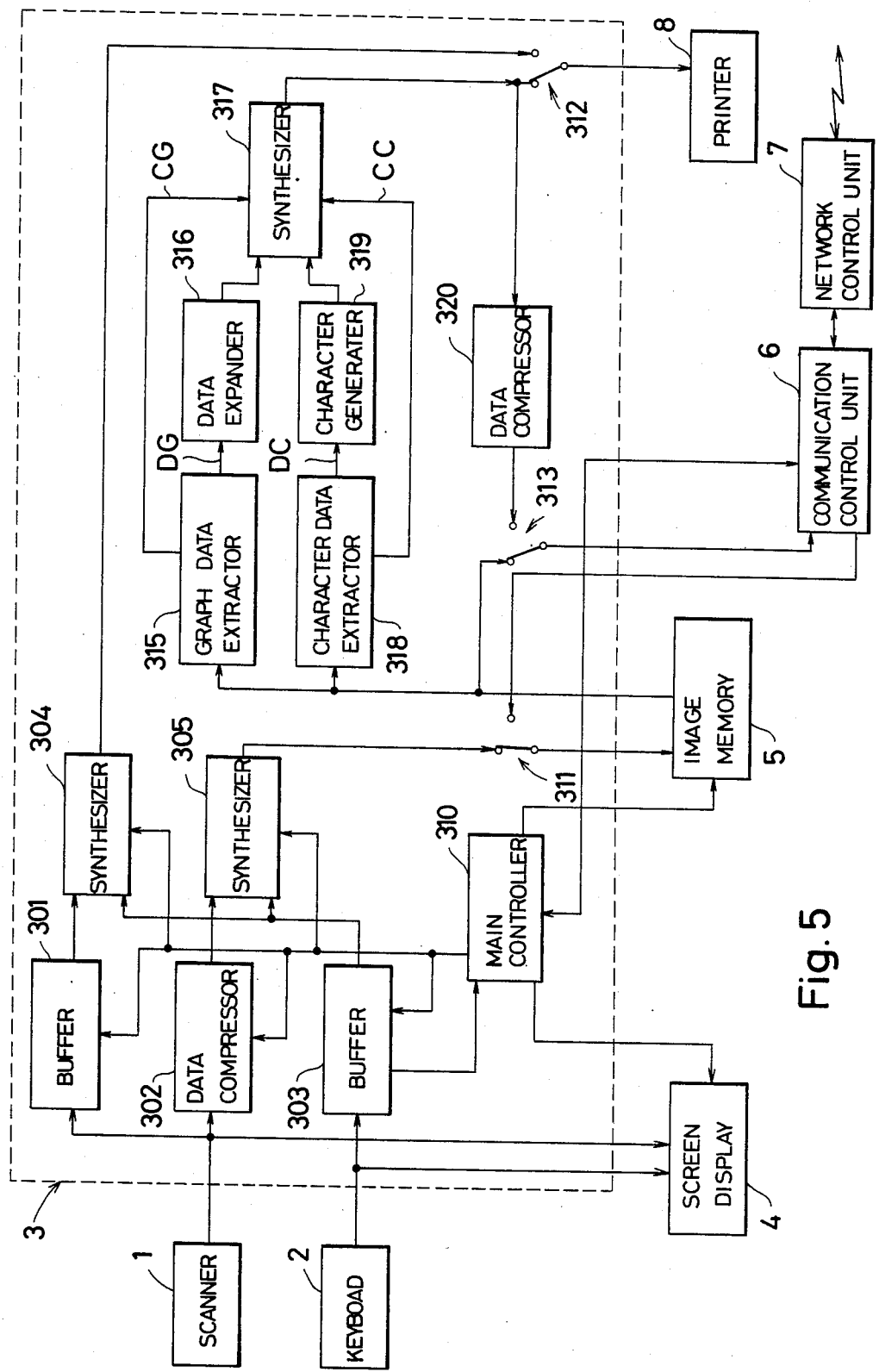
FIG. 5 is a block diagram showing the detailed structure of the screen editor shown in FIG. 1.

Referring back to FIG. 1, the screen editor 3 is connected to a communication control unit 6 which is responsible for transmission of data according to a predetermined transmission control procedure, and the communication control unit 6 is connected to a network control unit 7 which interfaces the communication control unit 6 with a transmission network, i.e., which connects and disconnects the communication control unit 6 to and from the transmission network. Also shown in FIG. 5 is a printer 8 as provided as connected to the screen editor 3, which produces a hard copy printout on which the information is printed in the form of dot matrix. That is, if desired to produce a hard copy of the information currently displayed on the screen of screen display 4, it is only necessary for the operator to operate the keyboard 2 to have the printer 8 print out the data stored in the image memory 5 on a sheet of recording paper.

Referring now to FIG. 5, there is shown in block form the detailed structure of the screen editor 3 shown in FIG. 4. As shown, the screen editor 3 includes a buffer 301 which is connected to receive data from the scanner 1 and which temporarily stores the graphic information supplied from the scanner 1 up to the amount corresponding to a single page. Also provided as connected from the scanner 1 is a data compressor 302 which compresses the graphic information supplied from the scanner 1 according to a predetermined encoding method. Another buffer 303 is provided as connected from the keyboard 2 and it serves to store the character information supplied from the keyboard 2 up to the amount corresponding to a single page and to extract control information, such as edit control information, to be supplied to a main controller 310. Also provided is a synthesizer 304 which is connected to receive outputs from the buffers 301 and 303 and which serves to combine the thus received outputs to produce information to be printed by the printer 8 when the system is operated in a local mode. Another synthesizer 305 is provided to receive output from the data compressor 302 and output from the buffer 303 and to combine these outputs to produce information to be stored in the image memory 5. As shown in FIG. 5, output terminals of synthesizers 304 and 305 are connected to respective contact points of switches 311 and 312.

In accordance with edit control information supplied through the buffer 303, the main controller 310 controls the operation of synthesizers 304 and 305 thereby forming synthesized data corresponding to the information displayed on the screen of screen display 4. It should be noted that the main controller 310 is also responsible for keeping proper timing in operation among the buffers 301 and 303 and data compressor 302. Also provided in the screen editor 3 is a graph data extractor 315 which extracts graph data DG from the data shown in FIG. 4 and stored in the image memory 5 to be supplied to a data expander 316 and which supplies control data CG to the synthesizer 317. On the other hand, a character data extractor 318 serves to extract character code data DC to be supplied to a character generator 319 and to supply control data CC to the synthesizer 317. As well known in the art, the data expander 316 functions to restore the graphic data DG under compression to original uncompressed image data, which is then supplied to the synthesizer 317.

In response to character code data DC supplied, the character generator 319 outputs character information in the form of dot matrix, which is then supplied to the synthesizer 317. The synthesizer 317 also receives control data CG supplied from the graph data extractor 315 and control data CC supplied from character data extractor 318 and, in accordance with these control data, combines output from the data expander 316 with output from the character generator 319 thereby forming image data consisting only of graphic information, which is then supplied to a second contact point of switch 312 and to a data compressor 320. Upon receipt of data, the data compressor 320 compresses the data in accordance with a predetermined encoding technique, and its output is supplied to a first contact point of switch 313, whose second contact point is connected to receive data read out of the image memory 5.

A switch 311 has a first contact point connected to the output of synthesizer 305 and a switching element connected to an input terminal of the image memory 5. Besides, the switch 312 has a switching element which may be switched to be in contact with either one of the two contact points and which is connected to the printer 8. The other switch 313 has a switching element which may be switched to be in contact with either one of the two contact points and which is connected to a transmitting data input terminal of communication control unit 6, which is also connected to a second contact point of switch 311.

With this structure, when the operator places an original document in position for optical reading by the scanner 1 and starts the scanning operation, the image of the original document is displayed on the screen of screen display 4, and, at the same time, the information on the screen is also stored in the buffer 301 and converted into codes by the data compressor 302. Then, if the operator feeds in character information through the keyboard 2 by designating the position where the character information is to be inserted, this position information, edit control information indicating an insertion mode and character data are once stored in the buffer 303, from where the edit control information is supplied to the main controller 310.

Accordingly, the main controller 310 causes the inserted characters to be displayed on the screen of screen display 4 at the designated position and supplies data indicating the position of insertion and size of the characters to be inserted to the synthesizer 305. As a result, the data corresponding to the information displayed on the screen of screen display 4 and shown in FIG. 4 is produced at the synthesizer 305 and stored into the image memory 5. Then, when the operator carries out additional modifications, such as moving, eliminating or inserting graphic image or characters, the main controller 310 always controls the synthesizer 305 correspondingly and the data stored in the image memory is renewed to be consistent with the information currently displayed on the screen of screen display 4.

Upon completion of editing the information on the screen, if the operator wishes to obtain a hard copy of the information now displayed on the screen, it is only necessary to depress a copy key (not shown) in the keyboard 2. With the copy key depressed, the main controller 310 causes the switch 312 to operate to establish a connection between the synthesizer 304 and the printer 8 so that the synthesized data is supplied to the printer 8 to be printed in the form of a hard copy.

In the case where there are plural pages of information to send, the above-described operation is repetitively carried out under the control of the operator and the data are stored in the image memory 5 corresponding to respective pages. Upon completion of storing data into the image memory 5, the operator then inputs the address information, e.g., telephone number, of a receiver terminal to which the data is to be sent using the keyboard 2. The address information thus inputted is then supplied to the communication control unit 6 which then causes the net control unit 7 to be activated thereby issuing a calling signal to the receiver terminal through a transmission line (not shown).

When a transmission line to the receiver terminal has been established, the communication control unit 6 executes a predetermined communication control procedure so that, prior to transmission of image data, the function possessed by the receiver terminal is determined by this procedure and its result is supplied to the main controller 310. In this case, if the receiver terminal is a class 2 G4 or class 3 G4 facsimile apparatus, the main controller 310 operates the switch 311 to establish connection between the image memory 5 and the communication control unit 6. As a result, when set in a data transmission mode, the data stored in the image memory 5 in the format shown in FIG. 4 is directly supplied to the communication control unit 6 from where the data is transmitted to the receiver terminal after having been suitably modulated at the communication control unit 6.

On the other hand, in the case where the receiver terminal is a class 1 G4 facsimile apparatus, the main controller 310 causes the switches 311 and 312 to be set as shown in FIG. 5 and the switch 313 to be operated to establish a connection between the data compressor 320 and the communication control unit 6. Accordingly, during a mode of data transmission, the data read out of the image memory 5 is supplied not only to the graph data extractor 315 but also to the character data extractor 318. As a result, the synthesizer 317 supplies as an output signal which is comprised only of graphic information and which is then supplied to the data compressor 320 to be compressed by encoding. The compressed image data from the data compressor 320 is then supplied through the switch 313 to the communication control unit 6 for transmission to the receiver terminal.

As described above, in accordance with the present invention, if the receiver terminal has been found to be a class 1 G4 facsimile apparatus having no function to receive character information in the form of codes, the present terminal apparatus automatically converts a mixture of graphic and character information into all graphic information prior to transmission to the receiver terminal, so that the transmission of data can be carried out without troubling the operator to check the type of the receiver terminal. If the graphic information to send requires a plurality of pages, then appropriate control information may be used in the control data CG. Similarly, when the same graphic information bridges between pages, appropriate information should be used in the control data CG.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A communication terminal apparatus comprising:
    first input means for inputting graphic information;
    second input means for inputting character information and control information for controlling the operation of said apparatus;
    editing means connected to said first and second input means for combining said graphic information and said character information to produce new information, said editing means including converting means for converting said new information into all graphic information;
    storing means connected to said editing means for storing said new information; and
    communication control means connected to said editing means for controlling a connection of said terminal apparatus to a transmission line for transmitting said new information stored in said storing means to at least one receiver terminal through said transmission line, wherein if said receiver terminal has been found to be incapable of receiving character data, said converting means is activated to convert said new information stored in said storing means into all graphic information prior to transmission through said communicating control means.

2. The apparatus of claim 1 further comprising display means connected to said editing means for displaying said new information stored in said storing means.

3. The apparatus of claim 2 further comprising printing means connected to said editing means for producing a hard copy of said information displayed on said display means.

4. The apparatus of claim 1 wherein said first input means includes a scanner for optically reading an original document to produce said graphic information.

5. The apparatus of claim 1 wherein said second input means includes a keyboard which can be operated by an operator to produce said character information and control information.

6. The apparatus of claim 1 wherein said converting means includes first extracting means for extracting said graphic information from said new information stored in said storing means; second extracting means for extracting said character information from said new information stored in said storing means; a character generator for generating a corresponding graphic information in response to said character information from said second extracting means; and synthesizing means for synthesizing said graphic information from said first extracting means and said graphic information from said character generator.

7. The apparatus of claim 1 wherein said storing means stores said character information in a first area of said storing means and said graphic information in a second area of said storing means.

* * * * *